(12) United States Patent
Jaladanki et al.

(10) Patent No.: US 8,108,475 B2
(45) Date of Patent: *Jan. 31, 2012

(54) METHODS AND APPARATUS FOR CATEGORIZING FAILURE MESSAGES THAT RESULT FROM EMAIL MESSAGES

(75) Inventors: Sreenivasulu Jaladanki, Cupertino, CA (US); R. David Lewis, Menlo Park, CA (US)

(73) Assignee: Acxiom Corporation, Little Rock, AR (US)

( * ) Notice: Subject to any disclaimer, the term of this patent is extended or adjusted under 35 U.S.C. 154(b) by 265 days.

This patent is subject to a terminal disclaimer.

(21) Appl. No.: 12/433,738

(22) Filed: Apr. 30, 2009

(65) Prior Publication Data

US 2009/0216850 A1    Aug. 27, 2009

Related U.S. Application Data

(63) Continuation of application No. 10/726,786, filed on Dec. 2, 2003, now Pat. No. 7,536,439.

(51) Int. Cl.
*G06F 15/16* (2006.01)

(52) U.S. Cl. ............ 709/206; 709/207; 709/245

(58) Field of Classification Search ............ 709/206, 709/207, 245
See application file for complete search history.

(56) References Cited

U.S. PATENT DOCUMENTS

| | | | |
|---|---|---|---|
| 6,438,583 B1 | 8/2002 | McDowell et al. | |
| 6,654,779 B1 | 11/2003 | Tsuei | |
| 6,694,353 B2 | 2/2004 | Sommerer | |
| 6,769,002 B2 | 7/2004 | Ayan | |
| 7,103,599 B2 | 9/2006 | Buford et al. | |
| 7,117,528 B1 | 10/2006 | Hyman et al. | |
| 7,194,484 B2 | 3/2007 | Aoki | |
| 7,219,131 B2 | 5/2007 | Banister et al. | |
| 2002/0103932 A1 | 8/2002 | Bilbrey et al. | |
| 2002/0143879 A1 | 10/2002 | Sommerer | |
| 2003/0200265 A1 | 10/2003 | Henry | |
| 2004/0044734 A1 | 3/2004 | Beck | |
| 2004/0064734 A1 | 4/2004 | Ehrlich | |
| 2004/0260778 A1 | 12/2004 | Banister et al. | |
| 2005/0114453 A1 | 5/2005 | Hardt | |

*Primary Examiner* — David Lazaro
(74) *Attorney, Agent, or Firm* — Kilpatrick Townsend & Stockton LLP; Mark Mathison (57) ABSTRACT

Techniques for classifying failure messages received from email messages that are sent are provided. A plurality of rules are created that are used to classify a plurality of failure types for email messages. Email messages are sent to an email address associated with an Internet service provider. When an email message fails, a failure message is determined. A rule that applies to the failure message is then determined and based on the rule, a failure type associated with the rule is determined. Once a failure type is determined, an action may be performed based on the failure type. For example, the email address associated with the email message may be marked as invalid.

18 Claims, 5 Drawing Sheets

METHODS AND APPARATUS FOR CATEGORIZING FAILURE MESSAGES THAT RESULT FROM EMAIL MESSAGES

CROSS-REFERENCE TO RELATED APPLICATIONS

This application is a continuation of prior application Ser. No. 10/726,786, filed Dec. 2, 2003, hereby incorporated by reference in its entirety for all purposes.

BACKGROUND OF THE INVENTION

The present invention generally relates to message processing and more specifically to methods and apparatus for categorizing failure messages received from email messages that are sent.

Advertising by email has become very popular with the advent of the Internet. The mass emailing of advertisements to users' email addresses allow an advertiser to reach a large amount of users very efficiently and cheaply.

An advertiser typically provides a list of email addresses to an email delivery service provider. The delivery service provider then generates emails to the users associated with the email addresses on the list. In some cases, the emails fail to be delivered. For example, an email address may not be valid, etc. Typically, the email delivery service provider just reports that the email failed to the advertiser.

Accordingly, apparatus and methods are desired for categorizing failure messages for email addresses.

BRIEF SUMMARY OF THE INVENTION

Embodiments of the present invention generally relate to categorizing failure messages received from email messages that are sent. A plurality of rules are created that are used to categorize failure messages in a plurality of failure types. Email messages are sent to an email address associated with an Internet service provider. When an email message fails, a failure message is determined. A rule that applies to the failure message is then determined and based on the rule, a failure type associated with the rule is determined. Once a failure type is determined, an action may be performed based on the failure type. For example, the email address associated with the email message may be marked as invalid.

In one embodiment, a method for managing failure messages for email messages is provided. The method comprises: determining a plurality of rules that classify failure messages in a plurality of failure types; sending an email message to an email address associated with an Internet service provider (ISP); determining a failure message for the email message; determining a rule in the plurality of rules that applies to the failure message; and determining, for the failure message, a failure type in the plurality of failure types based on the determined rule.

In another embodiment, a method for categorizing failure messages from a plurality of Internet service providers (ISPs) is provided. The method comprises: determining a plurality of failure types; determining a plurality of sets of rules for the failure types that categorize a failure message into a failure type, wherein each ISP in the plurality of ISPs is associated with a set of rules in the plurality of rules; receiving a failure message associated with an ISP; determining a set of rules that is associated with the ISP; determining a rule in the set of rules associated with the ISP for the failure message; and determining a failure type associated with the rule.

In yet another embodiment, a method for categorizing failure messages is provided. The method comprises: determining a plurality of failure types for failure messages; sending an email message to an email address associated with an Internet service provider (ISP); determining a failure message for the email message; and determining, for the failure message, a failure type in the plurality of failure types.

In another embodiment, a system for classifying failure messages is provided. The system comprises: a plurality of Internet service providers (ISPs); and a failure message processor configured to process failure messages associated with an ISP, the failure message processor comprising: a plurality of sets of rules that categorize failure messages into a failure type, wherein each ISP in the plurality of ISPs is associated with a set of rules; logic to determine a failure message associated with an ISP; logic to determine a set of rules that is associated with the ISP; logic to determine a rule in the set of rules associated with the ISP for the failure message; and logic to determine a failure type associated with the rule.

Embodiments of the present invention may also be included on a computer readable medium.

A further understanding of the nature and advantages of the invention herein may be realized by reference of the remaining portions in the specifications and the attached drawings.

DETAILED DESCRIPTION OF THE INVENTION

Figure 1:
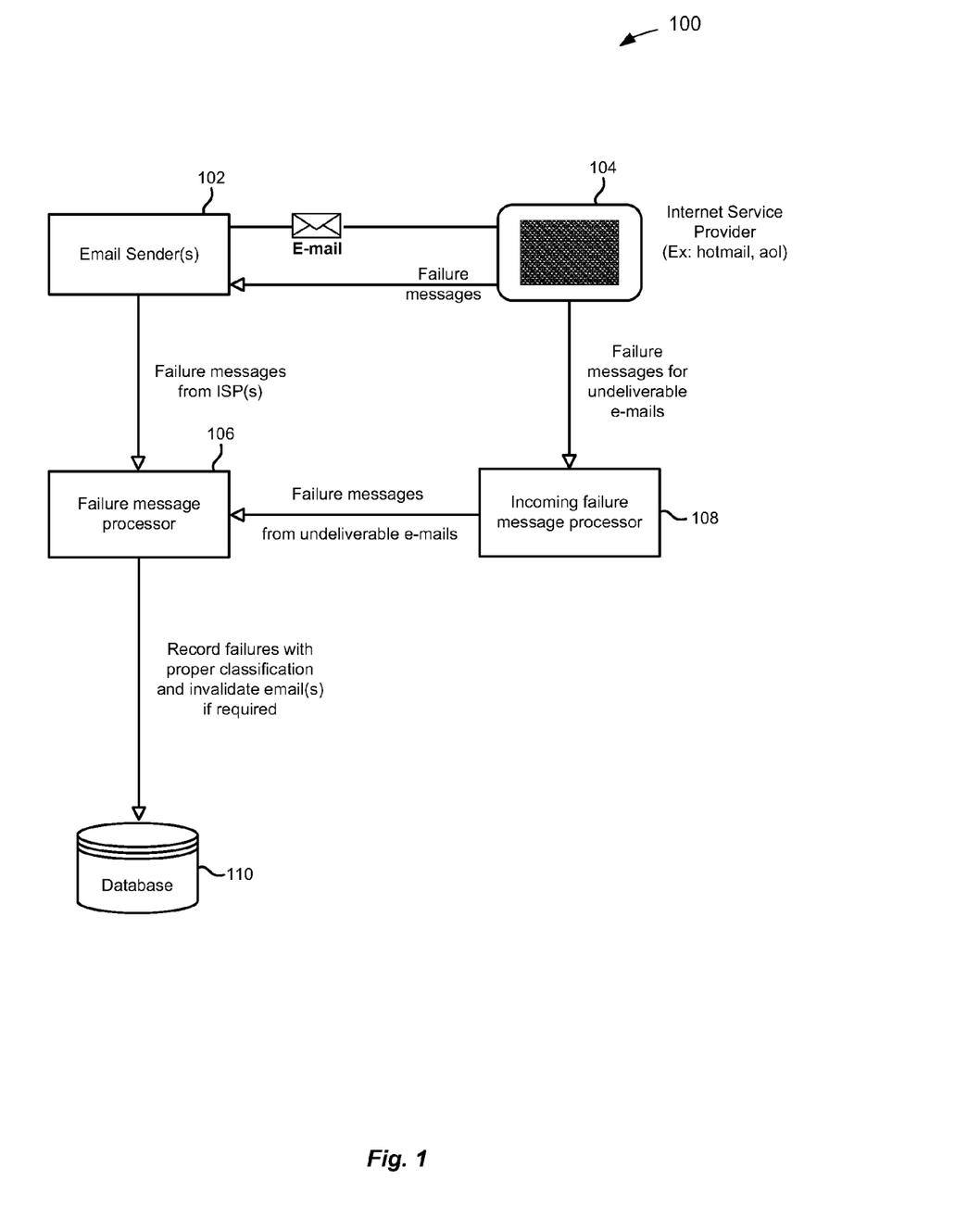
FIG. 1 depicts a system for classifying failure messages according to one embodiment of the present invention.

FIG. 1 depicts a system 100 for classifying failure messages according to one embodiment of the present invention. System 100 includes an email sender 102, an Internet service provider (ISP) 104, a failure message processor 106, an incoming failure message processor 108, and a database 110.

Email sender 102 is configured to send emails to email addresses. The emails are sent to an ISP 104 associated with the email address. For example, an email may be addressed to Joe@hotmail.com. An ISP 104 associated with the email is determined based on the domain of the email address, i.e., the part of the email address after the "@" sign. Thus, the ISP 104 is the ISP that processes emails sent to the "hotmail.com" domain.

ISP 104 is any entity that manages domains for email addresses. For example, an email service provider may be AOL, MSN, Yahoo, etc. An ISP 104 may be associated with multiple domains. For example, MSN is an ISP 104 for the domains hotmail.com and MSN.com.

When an email message fails, a failure message is sent from ISP 104 to the sender of the email. In one embodiment, a failure may occur before delivery of the email message or after delivery of the email message. A failure that occurs before delivery is when a failure message is returned to email sender 102 while email sender 102 is attempting to send an email to an email address associated with ISP 104. In this case, a connection may not have been established with ISP 104 or if a connection is made, an error may have occurred because ISP 104 could not deliver the email. Accordingly, the email message is not accepted by ISP 104 and a failure message is sent to email sender 102.

In another embodiment, ISP 104 may accept the email message from email sender 102, but a failure may occur in delivering the email message. In this case, ISP 104 may send a failure message back to the entity that sent the email. In one embodiment, the failure message is received at incoming failure message processor 108. Although it is described that incoming failure message processor 108 receives the message, it will be understood that email sender 102 or any other entity may receive the failure message.

The failure messages received in either of the above cases may include information that is usable by the failure message processor 106 to determine a failure type for the failure message. Failure message processor 106 may classify the failure message based on rules that are specific to different ISPs 104. For example, certain major ISPs 104 (e.g., the top fifteen) may have rules generated for them. In one embodiment, the major ISPs 104 are the ISPs that have a large amount of email addresses associated with them.

Different ISPs 104 return different failure messages. Rules are generated based on content that may be included in the different failure messages. The rules are each associated with a failure type. When it is determined that a rule is applicable for a failure message, the failure message is classified in the failure type associated with the rule. For example, content in a failure message is compared to the generated rules for an ISP 104 to determine a rule that applies to the failure message.

In one embodiment, generic rules may be used to categorize failure messages. Generic rules may be used for ISPs 104 other than the major ISPs 104. The generic rules attempt to classify content that may be received in a failure message for non-major ISPs 104. The rules may be applied to multiple ISPs 104 and thus may not be tailored for failure messages of a non-major ISP 104. Although generic ISP rules are described, it will be understood that all ISPs 104 may have specific rules for the ISP 104 applied.

An action may then be taken when the failure type is determined. For example, failure message processor 106 may apply invalidation rules that may invalidate an email address associated with the email message that caused the failure message.

Failure message processor 106 then stores information for the failure message in database 110. For example, the failure message along with the failure type may be stored. The stored information may also be associated with the email address and/or the email message that caused the failure message to be sent.

Figure 2:
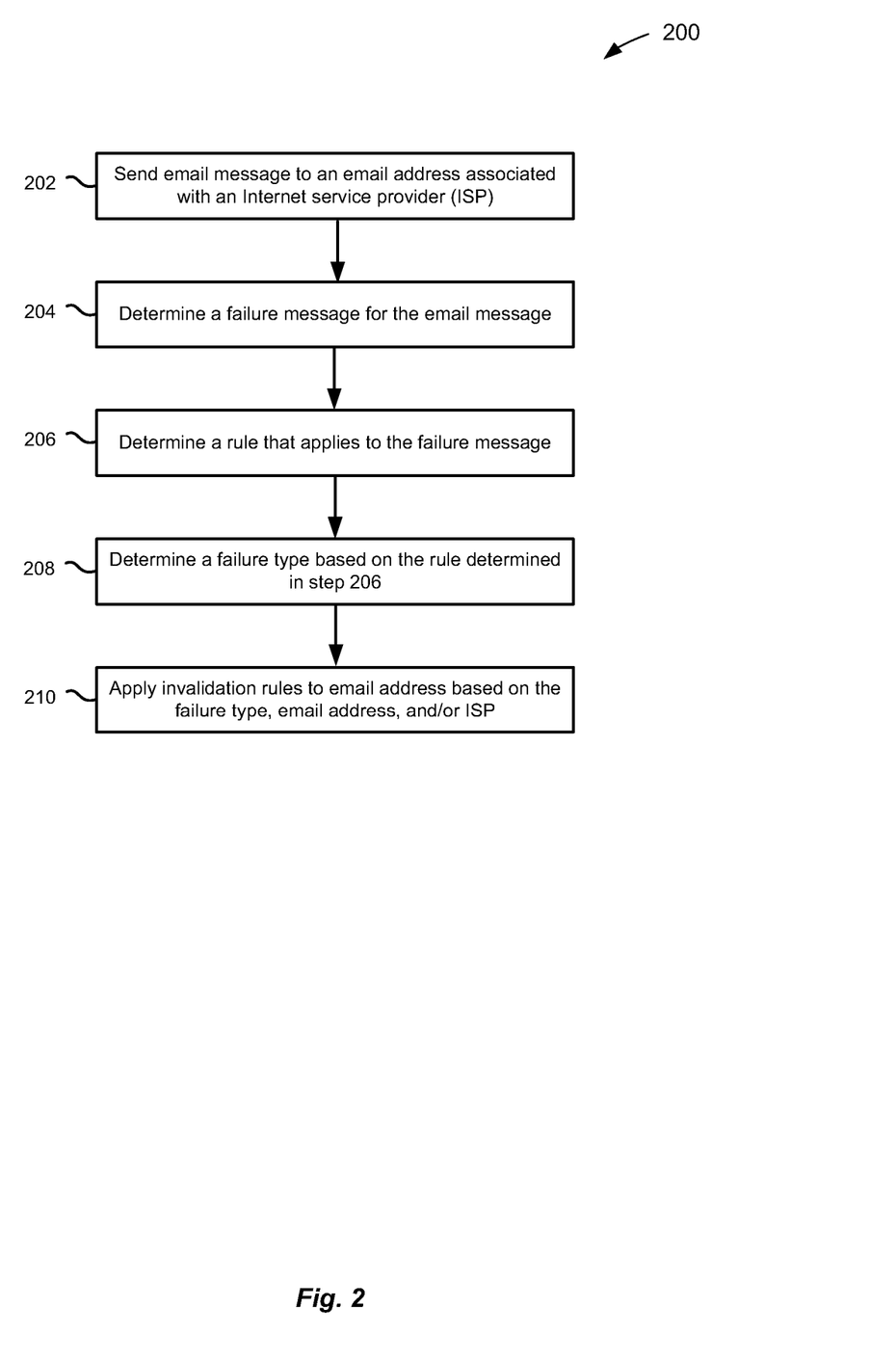
FIG. 2 depicts a simplified flowchart of a method for classifying failure messages according to one embodiment of the present invention.

FIG. 2 depicts a simplified flowchart 200 of a method for classifying failure messages according to one embodiment of the present invention. In step 202, an email message is sent to an email address associated with an ISP 104. Although the method is described with respect to a single email message, it will be understood that the method may be applied for multiple email messages. For example, in one embodiment, email addresses are received from an entity that wants emails to be sent to all of the email addresses. An email service provider then generates email messages and sends them to each email address received. For example, emails may be sent as an advertisement for the entity.

In step 204, failure messages are determined for the email message. The email message may fail for various reasons. As described above, an email message may fail before delivery or after delivery. In either case, a failure message is determined for the email address.

The email message may fail before delivery of the email for many reasons. For example, an email message may fail because the ISP 104 could not establish a network transfer. A failure may occur during an initial "handshake" between servers of ISP 104 and email sender 102. In this case, a connection with ISP 104 is not established. Also, a failure may result in a post handshake with email sender 102. The failure may also be associated with the email address (e.g., invalid email address, full mailbox, etc.). If a network transfer was not established, a failure message may be returned to email sender 102.

The email message may also fail after delivery. For example, a connection may be made but the email message may fail because the server was busy or the email address was blocked. Also, the failure may be associated with a bad domain, the server may be down or there may be a domain name server (DNS) configuration error.

Depending on the above failures, different failure messages are returned. Also, the failure messages returned differ among different ISPs 104. For example, different failure messages include different content. The content may be unique to each email message. For example, a failure message includes information that may characterize the error that occurred. In one embodiment, a failure message may include a simple mail transfer protocol (SMTP) code, an SMTP extension code, and a message. The SMTP code indicates a type of failure message. The SMTP extension code, also referred as enhanced code, includes information that further classifies a type of failure. The message indicates information on why the email message failed. An example of a failure message may be "553 5.4.3 user is unknown". "553" is the SMTP code, "5.4.3" is the SMTP extension code, and "user is unknown" is the message. In one embodiment, the SMTP code, SMTP extension code, and message returned for a failure may differ among ISPs 104. It will be understood that other information may be included and processed in a failure message.

In step 206, a rule that applies to the failure message is determined. In one embodiment, rules that are specific to an ISP 104 are used. When a failure message is received from an ISP 104, rules for that ISP 104 are applied to the failure message. Rules specific to an ISP 104 are used because different ISPs 104 may use different failure messages. Thus, different rules for different ISPs 104 are used to clarify failure messages into a number of failure types. In another embodiment, generic rules that are not specific to an ISP 104 that sent the failure message are used.

In one embodiment, the rules determined include regular expressions that are compared to information in the failure message. The content of the failure message is compared to the regular expressions to determine a regular expression that matches the content of the failure message. For example, a rule may specify that a failure message with a SMTP code, SMTP extension code, and a message may apply to the rule. A rule for the above example of a failure message may be "553.*5\.4\.3.*user.*Unknown.*". The ".*" in the regular expression indicates that any content may be found in the failure message where a ".*" is located. Thus, failure messages with slight variations may be associated with the same rule. For example, if a user's email address is included in a failure message, failure messages of the same type that include different email addresses in the message may still apply to the same rule. A person of skill in the art will appreciate other methods of categorizing rules. For example, a neural net may be used to determine a rule that applies to a failure message.

In step 208, a failure type is determined based on the rule determined in step 206. In one embodiment, each rule is associated with a failure type. In one embodiment, a failure type may map to different rules. For example, a first ISP 104 may have a first rule that maps to a "server busy" failure type and a second ISP 104 may have a second rule that maps to same "server busy" failure type. This is because different ISPs 104 return different failure messages that may be caused for the same failure.

In one embodiment, Table I shows failure types that may be used to classify failure messages from ISPs.

TABLE I

| Code | Description of Failure Type |
| --- | --- |
| 2000 | FAILED/TECHNICAL |
| 2101 | Server Down |
| 2201 | Server Too Busy |
| 2301 | Network Error |
| 2401 | DNS Error |
| 2501 | Message Format Error |
| 2601 | Fail/Technical - Other |
| 3000 | FAILED/BLOCK |
| 3101 | Spam |
| 3201 | Dirty List |
| 3301 | Bounce Mgmt |
| 3401 | Message Type |
| 3501 | Virus |
| 3601 | Failed/Block - Other |
| 4000 | FAILED/BOUNCE |
| 4100 | Hard Bounce |
| 4110 | Bad Address |
| 4111 | Address Error |
| 4112 | Bad Domain |
| 4120 | Bad User Name |
| 4121 | Unknown |
| 4122 | Closed/Disabled |
| 4131 | Individual Level Block |
| 4151 | Hard Bounce - Other |
| 4200 | Soft Bounce |
| 4211 | Mail-Box Full/Over limit |
| 4221 | Inactive |
| 4231 | Out-of-Office |
| 4241 | Soft Bounce - Other |
| 6001 | Unknown |

The codes in table I each correspond to one or more rules. Different rules may be associated with the same code. For example, a first rule for a first ISP 104 and a second rule for a second ISP 104 may be associated with the code 2101. The first and second rule may have different regular expressions but the rules are associated with the same failure type. The first and second ISPs 104 may return different failure messages for the same failure type but the messages are classified as the same failure type with the same code.

In step 210, invalidation rules are applied to the email address based on the failure type. Also, the domain part of the email address that caused the failure message and/or the ISP 104 associated with the failure message may be used in applying the invalidation rules.

In one embodiment, different invalidation rules may apply to different ISPs 104. For example, ISPs 104 that are considered major ISPs may have different invalidation rules than non-major ISPs 104. Thus, certain failure types may be treated differently among different ISPs 104. For example, an email address may be invalidated when a failure message from a major ISP 104 is classified in the failure type "4110 Bad Address". However, a different number of failures may be required to invalidate an email address for a generic ISP 104 if a failure message is classified in the above failure type. For example, it may take three failure messages for the above failure type before an email address is invalidated. The number of failures required to invalidate an email address associated with a generic ISP 104 may be greater for a number of reasons. For example, failure messages from generic ISPs 104 may not be as reliable. The generic rules may also not be as reliable because they are not tailored for the failure messages from the generic ISP 104.

In another embodiment, an action other than invalidating the email addresses may be performed. For example, an email address may be marked as possibly invalid. Also, a notification may be sent to an entity that indicates the email address has resulted in a failure of the failure type. Other actions will also be appreciated by a person skilled in the art.

Figure 3:
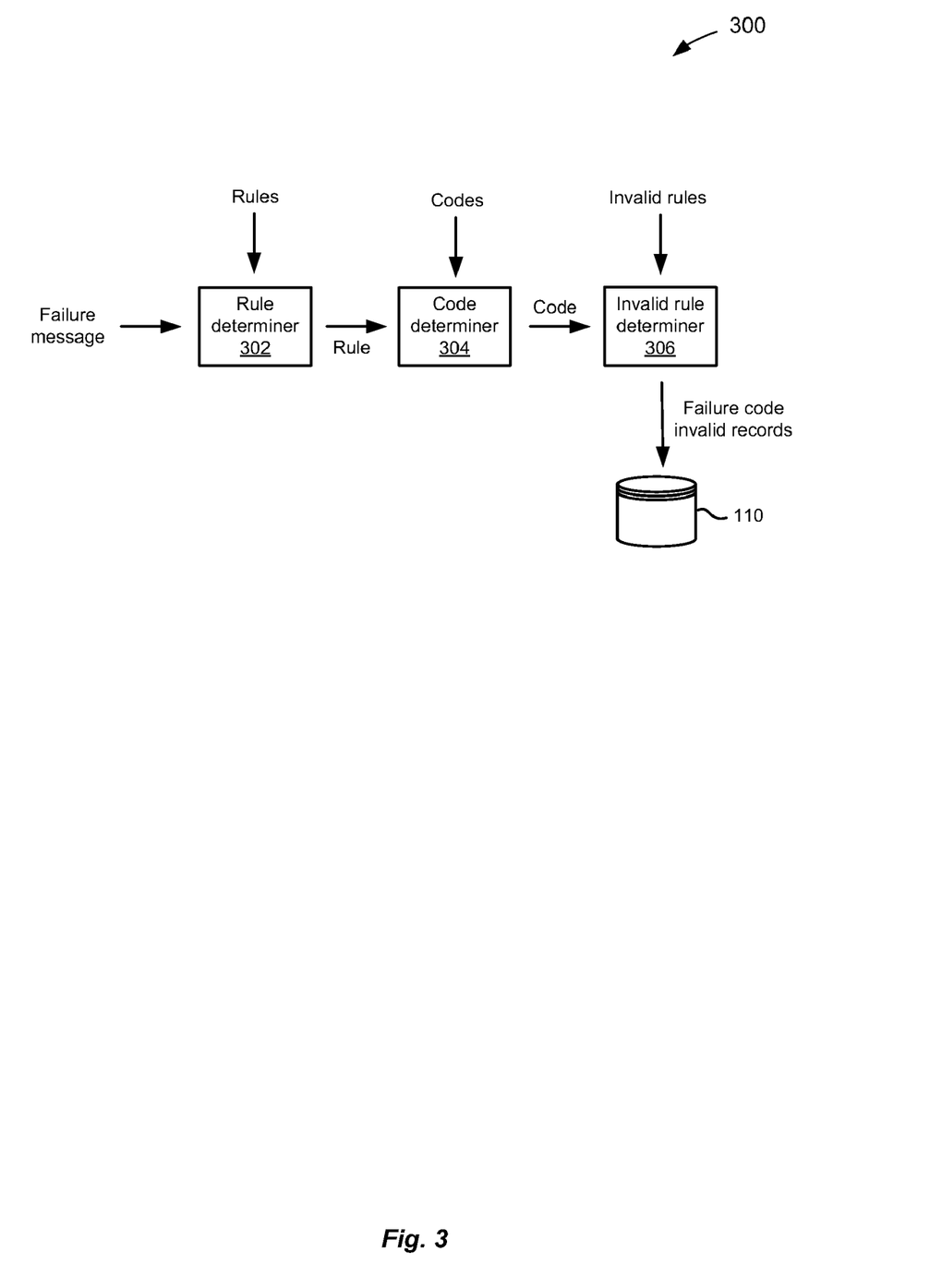
FIG. 3 depicts a system for classifying failure messages for email messages according to one embodiment of the present invention.

FIG. 3 depicts a system 300 for classifying failure messages for email messages according to one embodiment of the present invention. System 300 includes a rule determiner 302, a code determiner 304, and an invalid rule determiner 306.

Rule determiner 302 is configured to receive a failure message and determine a rule that applies for the failure message. Rule determiner 302 includes a plurality of rules that may apply to the failure message. The rules applied to the failure message may be ISP specific. In one embodiment, a regular expression for rules is compared to content of the failure message to determine a rule that applies to the failure message. Accordingly, rule determiner 302 performs the functions described in step 206 of FIG. 2.

Code determiner 304 receives the determined rule from rule determiner 302 and determines a code that is associated with the rule. A plurality of codes may be defined that are associated with specific rules. The codes are associated with different failure types that are determined for different failure messages. Code determiner 304 is configured to determine a code and a failure type that are associated with the determined rule. Accordingly, code determiner 304 performs the functions described in step 208 of FIG. 2.

Invalid rule determiner 306 receives the determined code from code determiner 304 and determines if an email address should be invalidated. A plurality of invalidation rules are used to determine if an email address should be invalidated. The invalidation rules may be ISP specific or may be generic. Invalidation rule determiner 306 is configured to determine if an email address associated with the failure message should be invalidated based on the determined code. Accordingly, invalidation rule determiner 306 performs the functions described in step 210 of FIG. 2.

Information for the failure message is stored in database 110. For example, the failure code is stored for an email address associated with the failure message. Additionally, if the email address is invalidated, the address may be marked as invalid in database 110.

Figure 4:
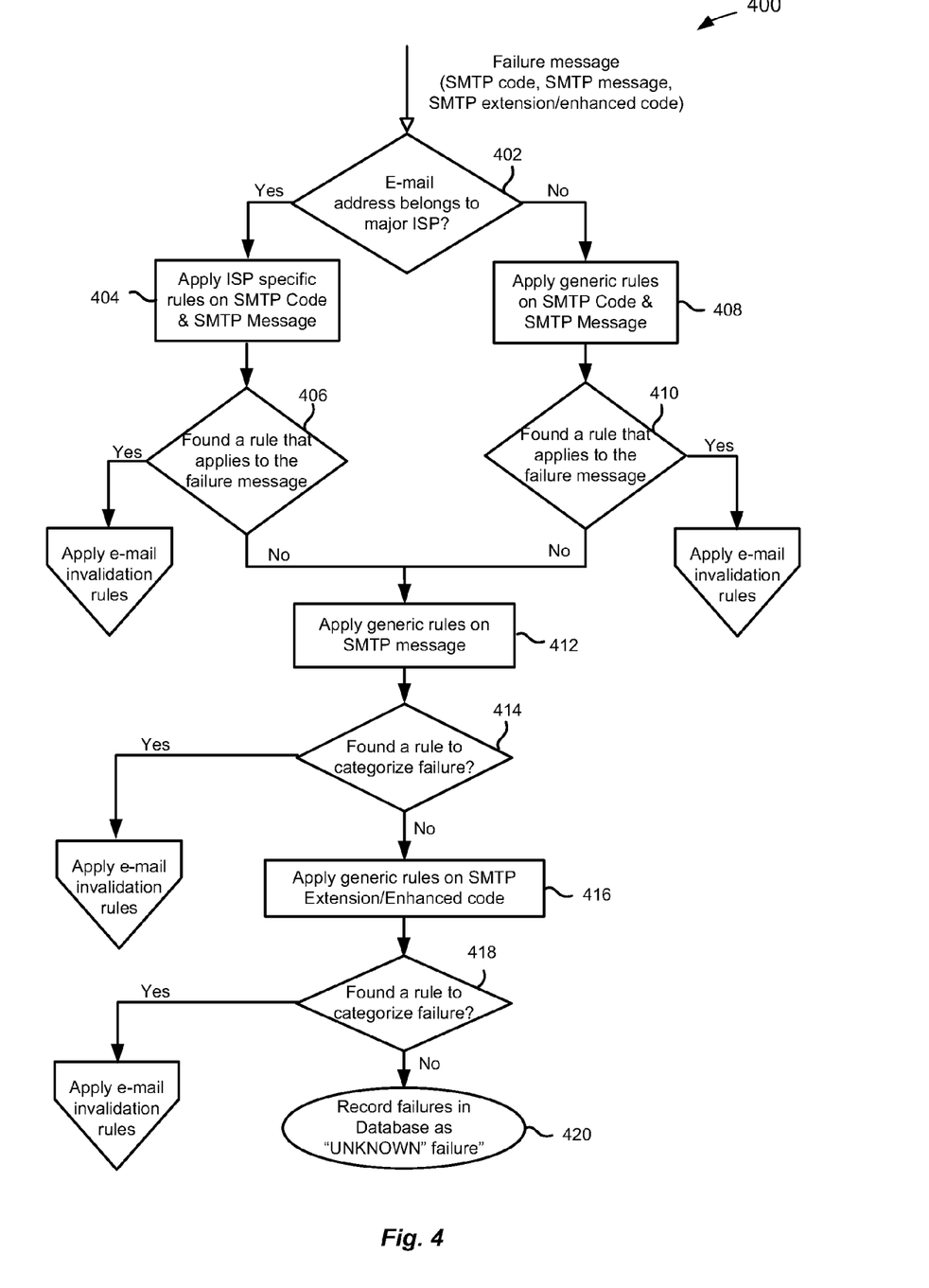
FIG. 4 depicts a simplified flowchart of a method for determining a rule that applies to a failure message according to one embodiment on the present invention.

FIG. 4 depicts a simplified flowchart 400 of a method for determining a rule that applies to a failure message according to one embodiment on the present invention. In step 402, a failure message is received and it is determined if an email address that caused the failure message belongs to a major ISP 104. In one embodiment, the failure message includes an SMTP code, an SMTP message and a SMTP extension/enhanced code.

In one embodiment, failure messages are processed differently if an ISP is determined to be a major ISP 104. For example, each major ISP 104 may return failure messages that are in different formats. Thus, rules specific to each major ISP 104 are determined and used. However, if an ISP 104 is not a major ISP 104, generic rules that applied across multiple non-major ISPs 104 may be used.

If the email address associated with the failure message belongs to a major ISP 104, then in step 404, rules specific to the ISP 104 for the email address are applied to the failure message. In one embodiment, the rules are applied based on the SMTP code and the SMTP message of the failure message. The SMTP code and SMTP message are compared to regular expressions associated with the rules to determine a regular expression that matches the SMTP code and message.

It should be understood that failure messages may be different in content but may apply to the same rule. For example, the SMTP code or SMTP message may vary slightly but may apply to the same rule. Thus, the messages would be classified in the same failure type.

In step 406, it is determined if a rule applies to the failure message. If a rule is found, then the process proceeds to apply email invalidation rules, which are described in FIG. 5.

If a rule is not found, the process proceeds to apply generic rules to the failure message, which will be described below in step 412.

In step 408, if the email address associated with the failure message does not belong to a major ISP 104, generic rules are applied for the failure message. The generic rules are used across ISPs 104 that do not fall under the major ISP rules. Thus, multiple ISPs 104 may have the same generic rules applied to their failure messages.

In one embodiment, the SMTP code and SMTP message are used to determine a generic rule that applies to the failure message. These rules may be applied as described in step 404.

In step 410, it is determined if a rule applies to the failure message. If a rule is found, then the process proceeds to a apply email invalidation rules, which are described in FIG. 5.

In step 412, if ISP specific rules or generic rules do not apply to the failure message, generic rules are applied for information other than the SMTP code and SMTP message. For example, just the SMTP message may be used to determine a rule that applies to the failure message. In one embodiment, for certain failures, an SMTP code may not be included in the failure message. Thus, the message may be the only option to classify a failure. The generic rules are not ISP-specific; thus, major ISP 104 and non major ISP 104 failure messages are processed with the generic rules. The generic rules are also applied to the SMTP message instead of the SMTP code and SMTP message in one embodiment.

In step 414, it is determined if a rule is found that applies to the failure message. If a rule is found, the process proceeds to apply email invalidation rules, which are described in FIG. 5.

If a rule is not found, in step 416, generic rules are applied for the SMTP extension/enhanced code. These rules are not ISP specific. The enhanced code may include information for the failure type. However, the enhanced code may not be used properly by ISPs. The enhanced code may not very reliable and are used as last resort in classifying a failure (when all above rules could not classify a message).

In step 418, it is determined if a rule is found that applies to the failure message. A rule is found that applies to the failure message email invalidation rules are applied as described in FIG. 5.

If a rule is not found, then the failure message is recorded as an unknown failure in step 420. The unknown failures may be further processed to determine if the failure message should apply to an existing failure type. If not, a new rule and a new failure type may be created for the unknown failure. For example, if multiple failure messages with the same content are received and classified as unknown, a new rule may be created where failure messages with the same content are classified as a new failure type.

Figure 5:
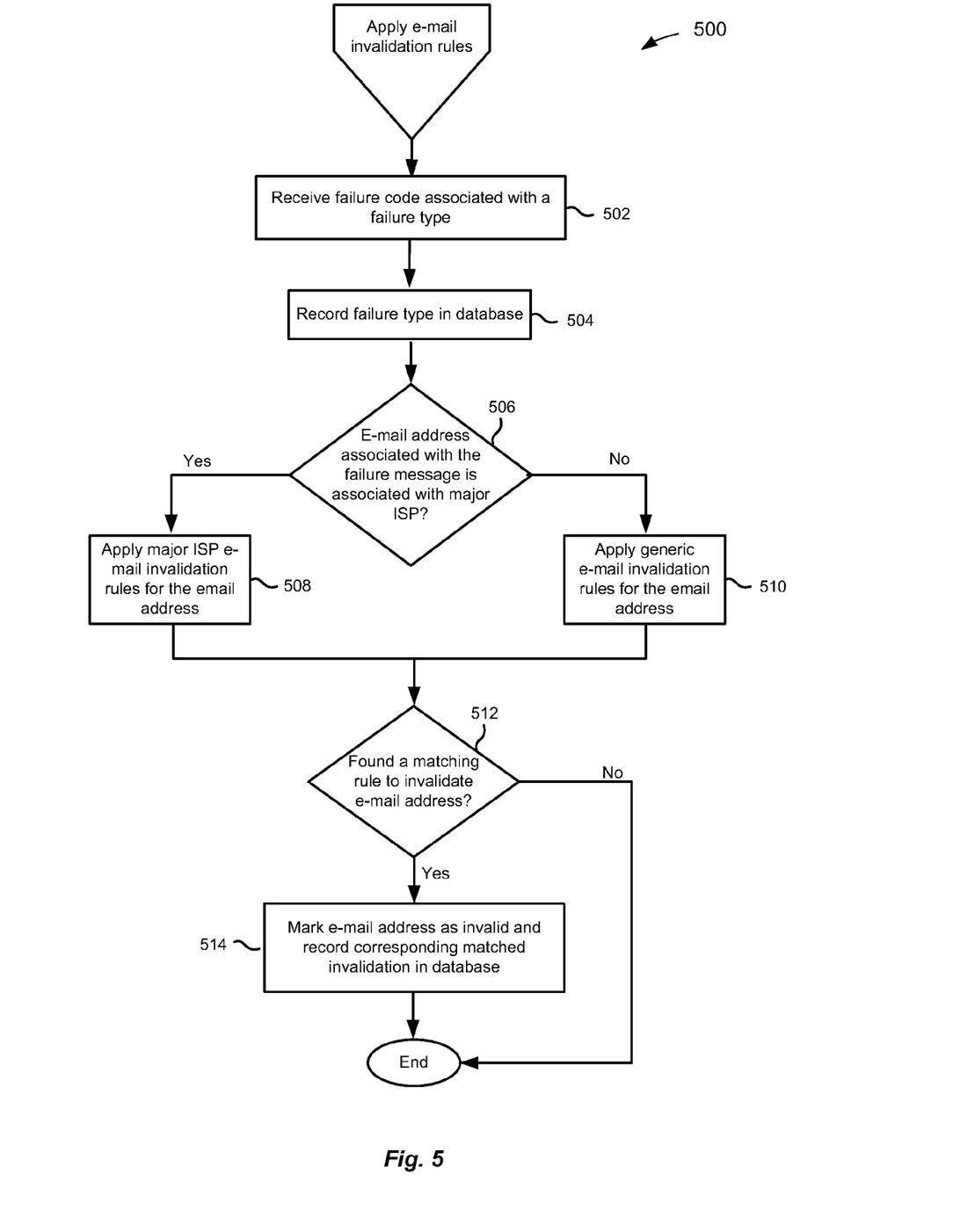
FIG. 5 depicts a simplified flowchart for a method for applying email invalidation rules according to one embodiment of the present invention.

FIG. 5 depicts a simplified flowchart 500 for a method for applying email invalidation rules according to one embodiment of the present invention. In step 502, a failure code associated with a failure type is received.

In step 504, information for a failure type is stored in database 110. For example, a failure code associated with the failure type determined is stored. The failure type may be stored and associated with the email address that caused the failure message. For example, a table that lists email addresses and their classified failure types may be stored in database 110.

In step 506, it is determined if an email address associated with the failure message is associated with a major ISP 104. In one embodiment, different invalidation rules may be applied for major ISPs 104. For example, invalidation rules for major ISPs 104 may be less lenient than invalidation rules for non-major ISPs 104. For example, a first failure of a certain failure type may result in an invalidation of an email address for major ISPs 104 while it may take multiple failures of the failure type to invalidate an email address for non-major ISPs 104.

In step 508, if the email address is associated with a major ISP 104, the major ISP email invalidation rules are applied for the email address. In one embodiment, there may be email invalidation rules that apply across all major ISPs 104 that are designated as major ISPs 104. In this case, email addresses are invalidated uniformly across major ISPs 104. Also, each ISP 104 may have its own invalidation rules.

In one example, for a major ISP 104, if a certain failure type is received, then the email address is invalidated after the first failure. Additionally for another failure type, the email address may be invalidated after three failure messages are received for the same failure type. For example, if a failure type is determined to be a hard bounce, the email address may be invalidated when the first failure message is received. If it is determined that the failure type is a "server too busy" failure, three failure messages may have to be received before an email address is invalidated.

In step 510, if the email address does not belong to a major ISP 104, generic email invalidation rules are applied for the email address. The generic email invalidation rules are used for non-major ISPs. In general, the generic email invalidation rules may be less stringent for invalidating an email address. For example, the failure messages from a non-major ISP 104 may be less reliable. Thus, if a failure message is determined to be of a hard bounce failure type, and the email address is associated with a non major ISP, the failure message may be less reliable than a hard bounce failure type from a major ISP.

In step 512, it is determined if a matching rule is found to invalidate the email address. If a rule is found, in step 514, the email address is marked as invalid and the matched invalidation rule is stored in database 308.

If a matching rule to invalidate the email address is not found, the process ends and does not invalidate the email address.

Accordingly, embodiments of the present invention apply rules to determine a failure type associated with the failure message. Based on the failure type, it is determined if an email address associated with the failure message should be invalidated. If so, the email message is invalidated.

Embodiments of the present invention categorize different failure messages that may be received from ISPs. Actions may then be taken based on the email address associated with the failure message and the type of the failure. Because the failure messages are categorized, the reasons why an email message failed may be reported to an entity that requested that the email be sent. Also, spam may be avoided because emails are invalidated that are resulting in failure messages. Additionally, if the reasons for failure unknown, entities can correspond with the ISPs to determine the cause of the failure.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope of equivalents.

What is claimed is:

1. A computer-implemented method for managing failure messages for email messages, the method comprising:
   receiving, in a computer, a failure message from an Internet service provider (ISP) as a result of a failure by the ISP to deliver an email message to an email address associated with the ISP;
   classifying, using a processor of the computer, a failure type of the failure using the failure message; and
   determining, using the processor, whether the email address is invalid based upon the failure type and based upon the associated ISP.

2. The method of claim 1, wherein classifying is based upon a rule selected from a plurality of rules, the method further comprising determining the rule from the plurality of rules based upon the associated ISP.

3. The method of claim 1, wherein classifying is based upon a rule selected from a plurality of rules, each rule of the plurality of rules corresponding to an ISP.

4. The method of claim 1, wherein classifying is based upon a simple mail transfer protocol (SMTP) code.

5. The method of claim 1, wherein classifying is based upon a simple mail transfer protocol (SMTP) extension code.

6. The method of claim 1, wherein classifying is based upon a search of the failure message using a regular expression.

7. The method of claim 6, wherein classifying is further based upon a simple mail transfer protocol (SMTP) code.

8. The method of claim 1, wherein the failure message comprises a failure message that is classified before delivery of the email message.

9. The method of claim 1, wherein the failure message comprises a failure message that is classified after delivery of the email message.

10. The method of claim 1, wherein the failure message comprises a failure message sent by the ISP.

11. The method of claim 1, further comprising storing information for the email address based on the failure type.

12. The method of claim 1, further comprising storing information for the email address based indicating the failure message of the failure type was received.

13. A system for managing failure messages for email messages, the system comprising:
   a failure message processor configured with logic, the logic configured to:
      receive a failure message from an Internet service provider (ISP) as a result of a failure by the ISP to deliver an email message to an email address associated with the ISP;
      classify a failure type of the failure using the failure message; and
      determine whether the email address is invalid based upon the failure type and based upon the associated ISP.

14. The system of claim 13, wherein the logic configured to classify a failure type is configured to classify the failure type based upon a rule selected from a plurality of rules, the logic further configured to determine the rule from the plurality of rules based upon the associated ISP.

15. The system of claim 13, wherein the logic configured to classify a failure type is configured to classify the failure type based upon a rule selected from a plurality of rules, each rule of the plurality of rules corresponding to an ISP.

16. A non-transitory computer-readable storage medium storing instructions for causing one or more computers to perform operations comprising:
   receiving, in a computer, a failure message from an Internet service provider (ISP) as a result of a failure by the ISP to deliver an email message to an email address associated with the ISP;
   classifying, using a processor operatively coupled to the computer, a failure type of the failure using the failure message; and
   determining, using the processor, whether the email address is invalid based upon the failure type and based upon the associated ISP.

17. The medium of claim 16, wherein classifying is based upon a rule selected from a plurality of rules, the method further comprising determining the rule from the plurality of rules based upon the associated ISP.

18. The medium of claim 16, wherein classifying is based upon a rule selected from a plurality of rules, each rule of the plurality of rules corresponding to an ISP.

* * * * *